United States Patent [19]
Knipe et al.

[11] Patent Number: 5,652,671
[45] Date of Patent: Jul. 29, 1997

[54] HINGE FOR MICRO-MECHANICAL DEVICE

[75] Inventors: Richard L. Knipe, McKinney; Frank J. Poradish, Plano, both of Tex.

[73] Assignee: Texas Instruments Incorporated, Dallas, Tex.

[21] Appl. No.: 268,741

[22] Filed: Jun. 30, 1994

[51] Int. Cl.⁶ .................................................. G02B 26/00
[52] U.S. Cl. ........................................ 359/291; 359/846
[58] Field of Search .............................. 359/291, 298, 359/230, 846, 847, 848, 849, 850, 290

[56] References Cited

U.S. PATENT DOCUMENTS

| | | | |
|---|---|---|---|
| 4,423,401 | 12/1983 | Mueller | 337/107 |
| 4,740,410 | 4/1988 | Muller et al. | 428/133 |
| 5,096,279 | 3/1992 | Hombeck et al. | 359/230 |
| 5,233,456 | 8/1993 | Nelson | 359/214 |
| 5,374,792 | 12/1994 | Ghezzo et al. | 200/16 B |
| 5,399,415 | 3/1995 | Chen et al. | 428/209 |

*Primary Examiner*—Ali Neyzari
*Assistant Examiner*—Dawn-Marie Bey
*Attorney, Agent, or Firm*—Julie L. Reed; James C. Kesterson; Richard L. Donaldson

[57] ABSTRACT

An improved hinge (12) for a micro-mechanical device (10). The hinge is fabricated from alternating layers (12a, 12b) of different materials. A first material is selected on the basis of its amenability to fabrication processes and a second material is chosen for its strength, or some other desired characteristic, relative to the first material.

20 Claims, 2 Drawing Sheets

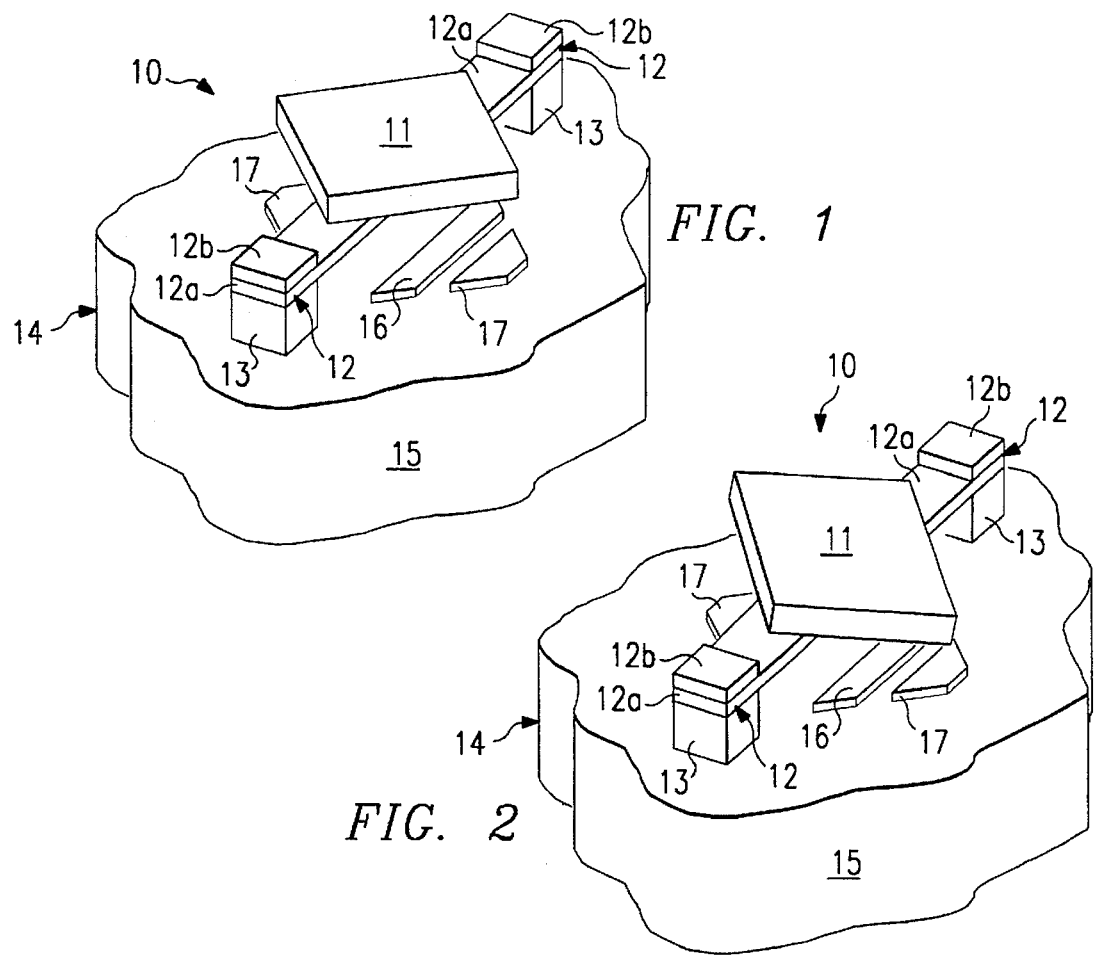
FIG. 1
FIG. 2
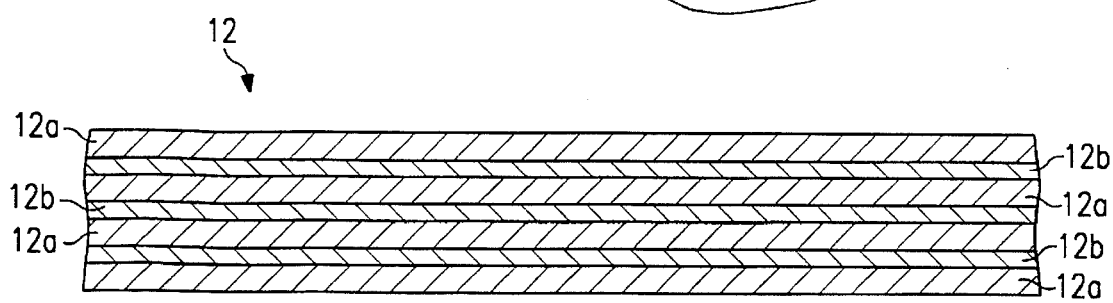
FIG. 3
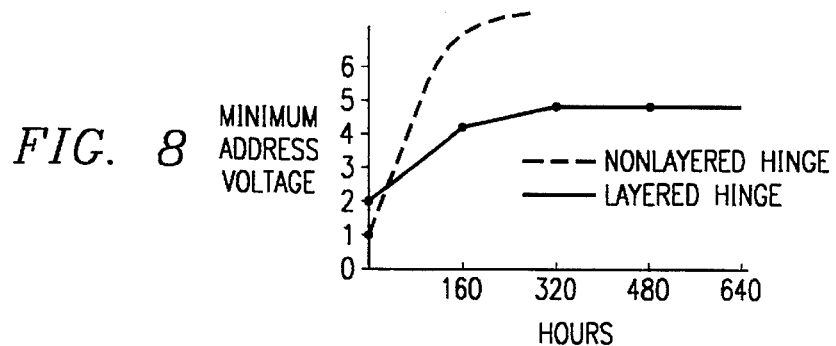
FIG. 8

HINGE FOR MICRO-MECHANICAL DEVICE

TECHNICAL FIELD OF THE INVENTION

This invention relates to micro-mechanical devices, and more particularly, to such devices having one or more movable elements that are moveable by means of a hinge.

BACKGROUND OF THE INVENTION

A recent development in the field of electro-mechanics has been the miniaturization of various mechanical devices. Typical of such devices are tiny gears, levers, and valves. These "micro-mechanical" devices are manufactured using integrated circuit techniques, often together with electrical control circuitry. Common applications include accelerometers, pressure sensors, and actuators. As another example, spatial light modulators can be configured from micro-mechanical reflective pixels.

One type of micro-mechanical spatial light modulator is a digital micro-mirror device (DMD), sometimes referred to as a deformable mirror device. The DMD has an array of hundreds or thousands of tiny tilting mirrors. Light incident on the DMD is selectively reflected or not reflected from each mirror to an image plane, to form images. To permit the mirrors to tilt, each mirror is mounted on one or more post-supported hinges. The mirrors are spaced by means of air gaps, over underlying control circuitry. The control circuitry provides electrostatic forces, which cause each mirror to selectively tilt. In many DMDs, an edge of the mirror contacts a landing electrode, which serves as a stop.

After continued use of the DMD, it is possible that the hinge will undergo mechanical relaxation as the result of repeated deformation. Another factor that may cause such relaxation is operation in extreme temperatures. When relaxation of the hinge occurs, the device may no longer operate properly.

SUMMARY OF THE INVENTION

One aspect of the invention is an improved micro-mechanical device of a type having at least one moving element that is supported by a hinge. The hinge has alternating layers of a first material and a second material. The first material is of a type conventionally used for micro-mechanical hinges because of its amenability to the processing flow. The second material has some desired characteristic that is relatively deficient in the first material, such as strength or thermal stability.

An advantage of the invention is that it provides a more elastic hinge, which increases the operational longevity of a DMD or other micro-mechanical device. The materials used for the layers can be selected on the basis of different desired properties. For example, layers of a "parent" material that is conventionally used for the hinge because of its amenability to the process flow may be alternated with layers of an "enhancer" material that adds strength to the hinge. Thus, the method of fabricating the hinge does not require substantial change to the etch chemistry of existing micro-mechanical fabrication processes.

BRIEF DESCRIPTION OF THE DRAWINGS

FIG. 1 illustrates an undeflected beam element of one type of micro-mechanical device, a digital micro-mirror device (DMD), made in accordance with the invention.

FIG. 2 illustrates the beam element of FIG. 1 in a deflected position.

FIG. 3 illustrates the hinge of FIGS. 1 and 2.

FIG. 8 illustrates the operational longevity of a hinge in accordance with the invention as compared to a conventional hinge.

DETAILED DESCRIPTION OF THE INVENTION

Figure 4:
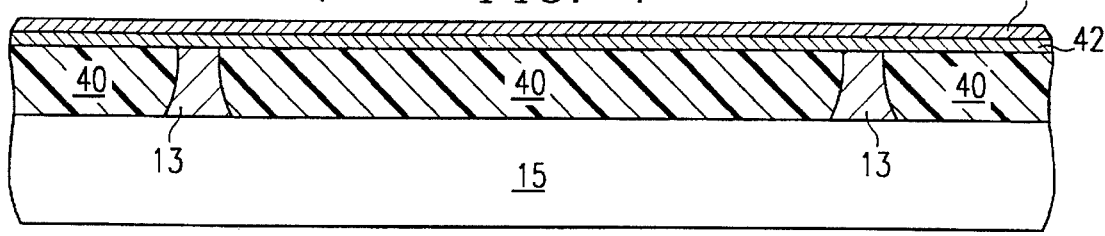
FIGS. 4–7 illustrates a method of fabricating a DMD with a hinge in accordance with the invention.

For purpose of example, the following description is in terms of a particular type of micro-mechanical device, a "digital micro-mirror device" (DMD), sometimes also referred to as a "deformable mirror device". As described in the Background, a DMD is comprised of tiny hinged mirrors, each supported over a substrate of control circuitry. The invention is used during fabrication of the DMD to provide an improved hinge.

One application of DMDs is for forming images, where the DMD has an array of deflectable mirrors that selectively reflect light to an image plane. The images formed by the DMD can be used in display systems or for non-impact printing applications. Other applications of DMDs are possible that do not involve image formation, such as optical steering, optical switching, and accelerometers. In some of these applications, the "mirror" need not be reflective. Also, in some applications, the DMD is operated in an analog rather than a digital mode. In general, the term "DMD" is used herein to include any type of micro-mechanical device having at least one hinge-mounted deflectable element that is spaced by an air gap from a substrate, relative to which it moves.

The invention could also be useful for other types of micro-mechanical devices that have moveable elements attached to hinges. Like the DMD's tilting beams, other micro-mechanical devices may have moving parts whose motion is due to deformation of the hinge, thereby giving rise to the possibility of mechanical relaxation of the hinge over time.

FIGS. 1 and 2 illustrate a single mirror element 10 of a DMD. In FIG. 1, the mirror 11 is undeflected, whereas in FIG. 2, the mirror 11 is deflected by being tilted toward a landing electrode 17. As indicated above, various DMD applications may use such beam elements 10 singly or in arrays.

The mirror element 10 of FIGS. 1 and 2 is known as a "torsion beam" element. Other types of beam elements 10 can be fabricated, including cantilever beam types and flexure beam types. Various DMD types are described in U.S. Pat. No. 4,662,746, entitled "Spatial Light Modulator and Method"; U.S. Pat. No. 4,956,610, entitled "Spatial Light Modulator"; U.S. Pat. No. 5,061,049 entitled "Spatial Light Modulator and Method"; U.S. Pat. No. 5,083,857 entitled "Multi-level Deformable Mirror Device"; and U.S. Pat. Ser. No. 08/097,824. Each of these patents is assigned to Texas Instruments Incorporated and each is incorporated herein by reference.

In operation for image display applications, a light source illuminates the surface of the DMD. A lens system may be used to shape the light to approximately the size of the array of beam elements 10 and to direct this light toward them. Each mirror element 10 has a tilting mirror 11 on torsion hinges 12 attached to support posts 13. These support posts 13 are formed on and extend away from the substrate 15. The mirrors 11 are positioned over a control circuit 14, which is comprised of address and memory circuitry fabricated on the substrate 15.

Voltages based on data in the memory cells of control circuit 14 are applied to two address electrodes 16, which are located under opposing corners of mirror 11. Electrostatic forces between the mirrors 11 and their address electrodes 16 are produced by selective application of voltages to the address electrodes 16. The electrostatic force causes each mirror 11 to tilt either about +10 degrees (on) or about −10 degrees (off), thereby modulating the light incident on the surface of the DMD. Light reflected from the "on" mirrors 11 is directed to an image plane, via display optics. Light from the "off" mirrors 11 is reflected away from the image plane. The resulting pattern forms an image. The proportion of time during each image frame that a mirror 11 is "on" determines shades of grey. Color can be added by means of a color wheel or by a three-DMD setup.

In effect, the mirror 11 and its address electrodes 16 form capacitors. When appropriate voltages are applied to mirror 11 and its address electrodes 16, a resulting electrostatic force (attracting or repelling) causes the mirror 11 to tilt toward the attracting address electrode 16 or away from the repelling address electrode 16. The mirror 11 tilts until its edge contacts an underlying landing electrode 17.

Once the electrostatic force between the address electrodes 16 and the mirror 11 is removed, the energy stored in the hinge 12 provides a restoring force to return the mirror 11 to an undeflected position. Appropriate voltages may be applied to the mirror 11 or address electrodes 16 to aid in returning the mirror 11 to its undeflected position.

As indicated in FIGS. 1 and 2, hinge 12 is comprised of alternating layers 12a and 12b of different materials. As explained below, one layer is made from a "parent" material typically used for such hinges due to the amenability of that material to the fabrication process flow of the device. The other layer is an "enhancer" material that adds some desired characteristic to the hinge, such as strength or thermal stability. In the example of this description, layers 12a and 12b are alumina and aluminum, respectively, with alumina being the stronger material. The total thickness of hinge 12 is in the order of 100–1000 angstroms, with the thickness of each layer 12a and 12b being some portion of this total thickness. The use of only two layers is for purposes of illustration—a typical hinge 12 will have several alternating layers of each material. As another example, the enhancer material may be encapsulated by the parent material in the sense that a core layer of the enhancer material will have a layer of parent material above and below it.

FIG. 3 is a cross-sectional view of hinge 12. In this example, there are 4 layers 12a of the parent material and 3 layers 12b of another material. The thickness of each layer 12a is approximately 75 angstroms, and the thickness of each layer 12b is approximately 50 angstroms.

As stated above, the parent material is selected for its amenability to conventional processing steps used during fabrication of a micro-mechanical device. In accordance with this criteria, the parent material is primarily aluminum. Aluminum is a material likely to be selected for the parent material, because, for various reasons, other structures in the same device are likely to be aluminum. Also, with respect to the hinge in particular, aluminum is suitable for patterning processes, such as photoresist etching. For purposes of this description, this characteristic of the parent material used for layers 12a is referred to as its "amenability to processing" and means that the parent material is of a type conventionally used for micro-mechanical devices.

The "enhancer" material is chosen for some characteristic that may be lacking in the first material. In the example of this description, the second type of material constrains the relaxation of the parent material. This is achieved when the second material is stronger (less ductile) than the parent material. Accordingly, the enhancer material is alumina.

When it is desired to enhance the strength of the hinge, alumina is only one possible candidate for the material of layers 12b. Other candidates for layers 12b are titanium, titanium-tungsten alloys, tungsten, tantalum, chromium, zinc sulfide, poly silicon, silicon dioxide, copper, molybdenum, nickel, and aluminum nitride. Each of these materials has an inherent strength greater than that of aluminum, in the sense that after repeated deformation, a strip of the material will not lose stress as quickly.

Other combinations of materials can improve other performance criteria. Temperature stability can be improved by adding layers of a material that is more stable over a greater range of temperatures than the parent material.

FIGS. 4–7 illustrate the method aspects of the invention, used to form hinge 12. For purposes of example, the method of the invention is described in terms of fabricating a single mirror element 10 of a DMD of the type described above. Typically, the method will be performed during fabrication of a DMD having an array of beam elements 10, or during fabrication of any other micro-mechnical device having at least one moveable element.

In general, the process of FIGS. 4–7 involves alternating steps of depositing layers of hinge 12. For purposes of example, the deposition of only two layers is illustrated, but it should be understood that a greater number of layers could be deposited by performing additional deposition steps.

In FIG. 4, support posts 13 have been patterned on substrate 15 by a process such as a photoresist etch. A spacer material 40 has been deposited, and has been processed so as to fill in the spaces between posts 13 in a manner that makes the top surface of the spacer material 40 substantially co-planar with the top of posts 13.

A first layer 42 for hinge layer 12a has been deposited and patterned on the surface provided by the top surfaces of spacer material 40 and the top surfaces of support posts 13. A second layer 44 for hinge layer 12b is then deposited and patterned over first layer 42. The deposition for both layers may be by any conventional means such as sputtering. The patterning forms the hinge pattern evident in FIGS. 1 and 2. As stated above, first layer 42 and second layer 44 are of different materials, with one material being a parent material that is amenable to processing and the other material being an enhancer material that improves some performance criteria that is relatively deficient in the parent material. Consistent with the example of this description, the two materials for layers 42 and 44 are alumina and aluminum, respectively. However, as discussed above, other materials are possible for both layers.

Figure 5:
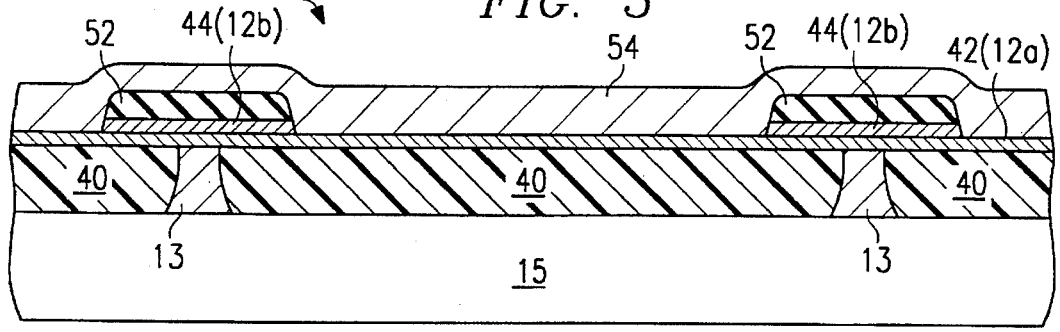

In FIG. 5, an oxide layer 52 has been deposited over layer 44, then patterned and etched to create oxide strips of layer 44 over support posts 13. A mirror layer 54 is then deposited over the now-exposed surface of layer 42 as well as over what remains of oxide layer 52. A commonly used material for mirror layer 54 is aluminum because of its reflectivity, which is consistent with the "amenability to processing" characteristic of layer 44. In the example of this description, only layer 44 is etched, but it should be understood that etching to remove portions of hinge layers 12a and 12b, such as in FIG. 5, is optional. For a hinge 12 having multiple layers of each material, the etch could be performed on layers of both types of materials.

Figure 6:
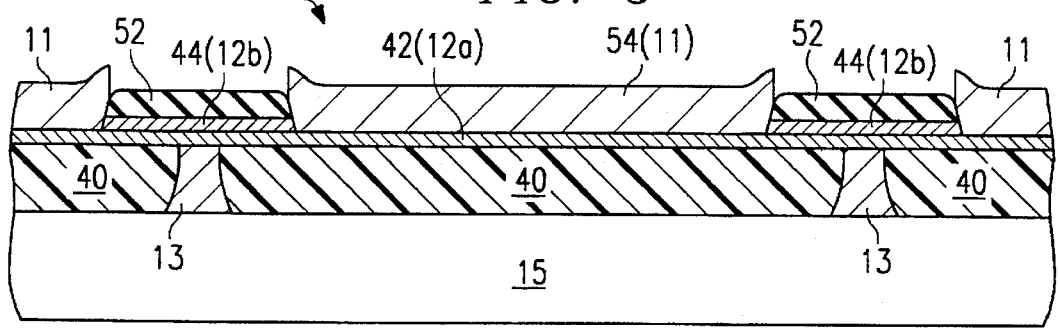

In FIG. 6, mirror layer 54 is patterned and etched with a process that is selective to the oxide remaining from oxide layer 52. Referring to FIGS. 1 and 2 as well as to FIG. 6, the result is the formation of a mirror 11 for each mirror element 10.

Figure 7:
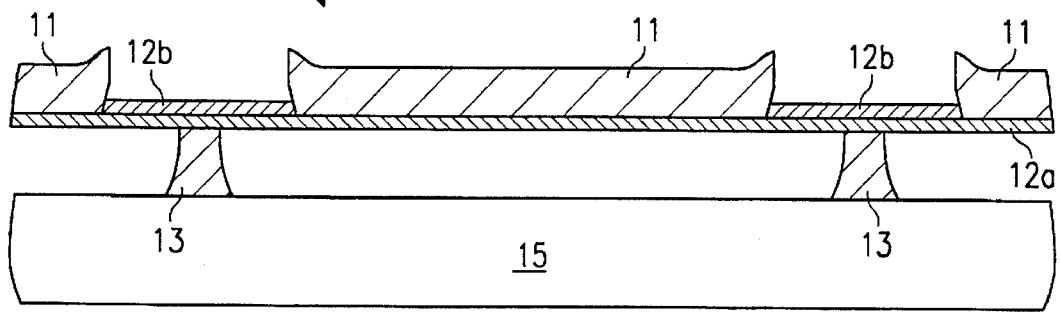

In FIG. 7, spacer material 40 and the remaining portions of oxide layer 52 are removed. This permits mirror 11 to rotate as discussed above. As in FIGS. 1 and 2, hinge 12 is comprised of two layers 12a and 12b, with layer 12b being the parent layer that is the same material as mirror 11. Thus, hinge layer 12b is also reflective, as well as amenable to the same subsequent processing steps as mirror 11.

FIG. 8 illustrates a comparison of a layered hinge in accordance with the invention and a hinge made from a single layer of aluminum. The hinges were used as hinges 12 in the mirror element 10 illustrated in FIGS. 1 and 2, except that in the comparison of FIG. 8, hinge 12 had 4 layers of aluminum, each approximately 120 angstroms thick, and 5 layers of alumina, each approximately 30 angstroms thick.

The comparison is in terms of load relaxation, measured as an increase in the minimum address voltage required to tilt mirror 11 in either direction. When the minimum address voltage reaches the maximum produced by the underlying control circuitry 14, the mirror element 10 is considered to have failed. After 100 hours of operation, the non-layered hinge failed. However, the layered hinge failed after 600 hours of operation.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed:

1. An improved micro-mechanical device of a type having at least one moving element that is supported by a hinge, wherein the improvement comprises:

a hinge that has alternating layers of a first material and a second material, said first material being amenable to processing of said micro-mechanical device and said second material being less ductile than said first material, wherein both said materials constitute said hinge during operation of said device, and wherein said hinge supports said moving element such that said moving element rests upon said first material, supported by said hinge over an air gap and said second material extends over said first material from a support post to said moving element.

2. The device of claim 1, wherein said first material is primarily aluminum.

3. The device of claim 2, wherein said second material is primarily alumina.

4. The device of claim 2, wherein said second material is primarily titanium.

5. The device of claim 2, wherein said second material is primarily tungsten.

6. The device of claim 2, wherein said second material is primarily tantalum.

7. The device of claim 2, wherein said second material is primarily chromium.

8. The device of claim 2, wherein said second material is primarily zinc sulfide.

9. The device of claim 1, wherein said second material is primarily aluminum nitride.

10. A improved method of fabricating a hinge for a micro-mechanical device having at least one moveable element attached to the hinge so that said element may move, said improvement comprising the steps of:

depositing a layer of a first material upon a spacer layer, said first material being amenable to processing of said micro-mechanical device;

depositing a layer of a second material over said layer of a first material, said second material being less ductile than said first material;

etching said first or said second layer, or both, to pattern said hinge, wherein said hinge remains constituted from both layers after said etching; and depositing a third layer of material to form said moveable element, such that said moveable element rests on said first material, supported by said hinge over an air gap and said second material extends over said first material from a support post to said movable element.

11. The device of claim 10, wherein said first material is primarily aluminum.

12. The device of claim 11, wherein said second material is primarily alumina.

13. The device of claim 11, wherein said second material is primarily titanium.

14. The device of claim 11, wherein said second material is primarily tungsten.

15. The device of claim 11, wherein said second material is primarily aluminum nitride.

16. A digital micro-mirror device (DMD), comprising:

a substrate upon which the following elements are fabricated: at least one landing electrode, a support post, a hinge extending from said support post, a mirror attached to said hinge, wherein said hinge is deformable so as to permit said mirror to move toward said landing electrode upon being subjected to an applied force; and wherein said hinge has alternating layers of a first material and a second material, said first material being selected for its amenability to processing of said DMD and said second material being selected for its greater strength relative to said first material, wherein both materials constitute said hinge in operation of said device wherein said second material extends from said post to said mirror, covering said first material.

17. The device of claim 16, wherein said first material is primarily aluminum.

18. The device of claim 17, wherein said second material is primarily alumina.

19. The device of claim 18, wherein said layers of said first material are approximately 75 angstroms thick, and said layers of said second material are each approximately 50 angstroms thick.

20. The device of claim 16, wherein each of said layers is less than 100 angstroms thick.

* * * * *